US006593735B2

(12) United States Patent
Becker

(10) Patent No.: US 6,593,735 B2
(45) Date of Patent: *Jul. 15, 2003

(54) APPARATUS FOR SENSING POSITION OF A VEHICLE SEAT

(75) Inventor: David L. Becker, White Lake, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/826,133

(22) Filed: Apr. 4, 2001

(65) Prior Publication Data

US 2002/0145418 A1 Oct. 10, 2002

(51) Int. Cl.⁷ ................................................ G01B 7/14
(52) U.S. Cl. .............................. 324/207.26; 324/207.2; 280/735
(58) Field of Search ................... 324/207.2, 207.21, 324/207.24, 207.25, 207.26, 235, 251, 252; 338/32 R, 32 H; 335/205; 307/116; 280/735

(56) References Cited

U.S. PATENT DOCUMENTS 3,660,795 A * 5/1972 Kobayashi ................ 338/32 H
5,967,549 A    10/1999 Allen et al.
6,053,529 A     4/2000 Frusti et al.
6,095,555 A     8/2000 Becker et al.
6,275,026 B1 *  8/2001 Becker ..................... 324/207.2

OTHER PUBLICATIONS

U.S. Becker Patent Appln. Publication No. US 2002/0145418 A1, published Oct. 10, 2001, entitled "Apparatus for Sensing Position of a Vehicle Seat".

* cited by examiner

Primary Examiner—Walter E. Snow
(74) Attorney, Agent, or Firm—Tarolli, Sundheim, Covell & Tummino L.L.P.

(57) ABSTRACT

An apparatus (10) for sensing when a rail member (48) of a vehicle seat (12) is located in a reference position relative to a seat bracket (30) of the vehicle seat (12) comprises a magnetic sensor (76) for generating a magnetic field and for sensing a flux density of the magnetic field. The apparatus (10) further comprises a cover (86) for enclosing the magnetic sensor (76). The cover (86), when in a first position, forms a zone for preventing the flux density from increasing above a threshold level. The cover (86) is moved into a second position when the rail member (48) is located in the reference position relative to the seat bracket (30). In the second position, the flux density is increased above the threshold level.

10 Claims, 8 Drawing Sheets

APPARATUS FOR SENSING POSITION OF A VEHICLE SEAT

TECHNICAL FIELD

The present invention relates to an apparatus for sensing whether a vehicle seat is in a reference position. More particularly, the present invention relates to an apparatus for sensing position of a rail member of a vehicle seat relative to a bracket member of the vehicle seat.

BACKGROUND OF THE INVENTION

It is often desirable to know a position of a vehicle seat. For example, in a vehicle with a vehicle occupant protection device, such as an air bag, determined or sensed position of the seat may be used to determine control of the protection device.

A known seat position sensing apparatus includes a permanent magnet for producing a magnetic field and a Hall effect device for sensing the magnetic flux of the magnetic field. When a rail member of the vehicle seat is located in a position adjacent the apparatus, the flux density of the magnetic field increases. The Hall effect device senses the increased flux density. The increased flux density is indicative of a forward position of the vehicle seat.

Foreign ferrous materials that are introduced into the magnetic field may change the flux density of the magnetic field resulting in an inaccurate reading of the vehicle seat position. Examples of foreign ferrous material that may be present near the magnetic field of the known apparatus on a vehicle seat include paper clips, foil wrappers, ink pens, coins, etc.

SUMMARY OF THE INVENTION

The present invention is an apparatus for sensing when a rail member of a vehicle seat is located in a reference position relative to a seat bracket of the vehicle seat. The apparatus comprises a magnetic sensor for generating a magnetic field and for sensing a flux density of the magnetic field. The apparatus further comprises a cover for enclosing the magnetic sensor. The cover, when in a first position, forms a zone for preventing the flux density from increasing above a threshold level. The cover is moved into a second position when the rail member is located in the reference position relative to the seat bracket. In the second position, the flux density is increased above the threshold level.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
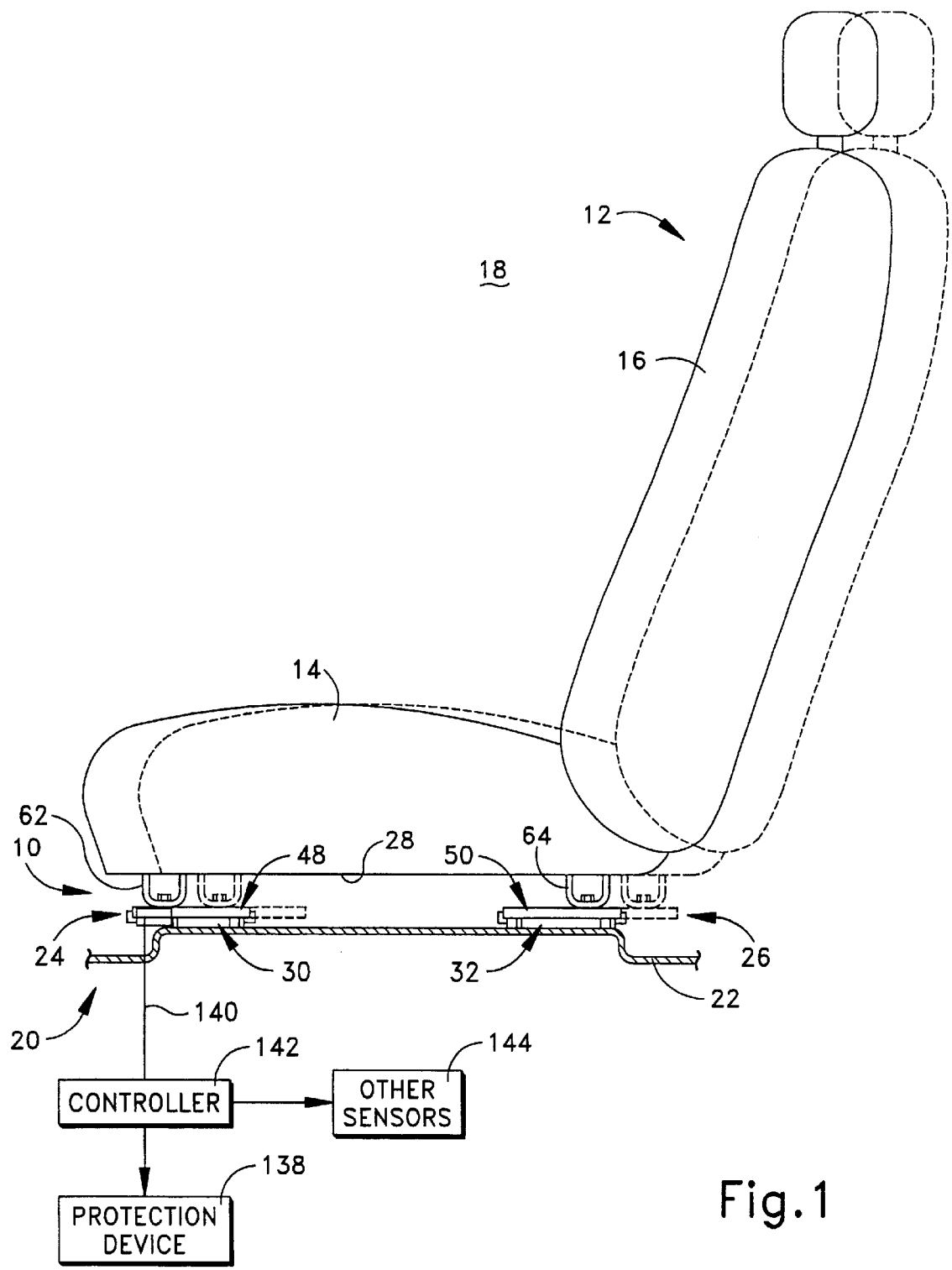
FIG. 1 is a schematic representation of a side view of a vehicle seat including an apparatus constructed in accordance with the present invention.

FIG. 1 illustrates a vehicle seat 12 including an apparatus 10 constructed in accordance with the present invention. The seat 12 includes a seat cushion portion 14 and a seat back portion 16. The seat 12 is located within an occupant compartment 18 of a vehicle 20 and is mounted to a lower body portion 22 of the vehicle 20. The position of the seat 12 relative to the lower body portion 22 of the vehicle 20 is adjustable in a forward and rearward direction in a manner known in the art. Solid lines in FIG. 1 illustrate the seat 12 in a forward position. Dashed lines in FIG. 1 illustrate the seat 12 in a rearward position.

Guide tracks 24 and 26 guide the adjustment of the seat 12 in a forward and rearward direction. While FIG. 1 illustrates a pair of such guide tracks 24 and 26, it will be appreciated that typically there are four such guide tracks near the corners of a lower surface 28 of the seat cushion portion 14 of the seat 12.

Figure 2:
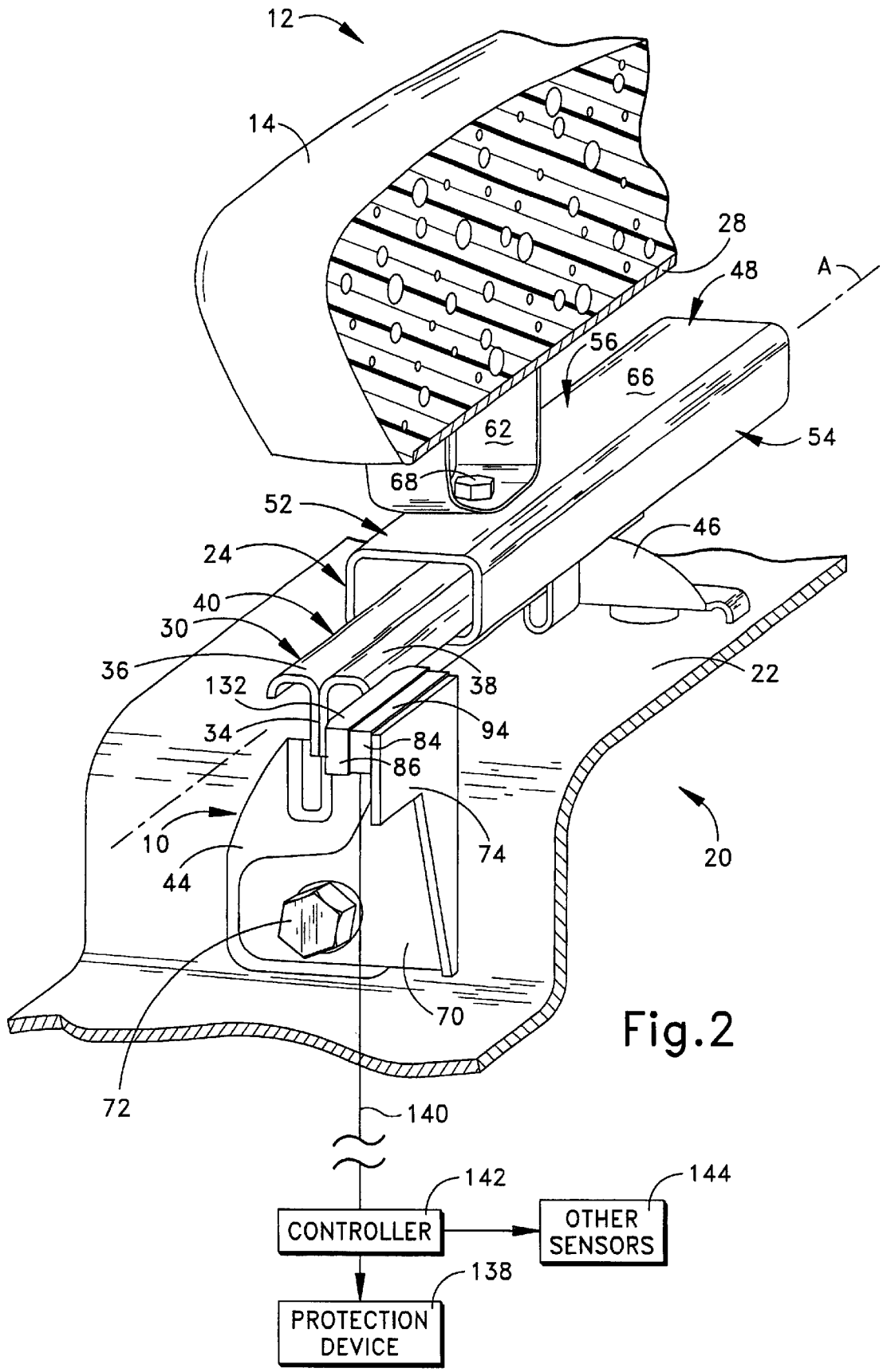
FIG. 2 is an enlarged perspective view of a portion of FIG. 1, illustrating a rail member of the vehicle seat rearward of a reference position.
Figure 3:
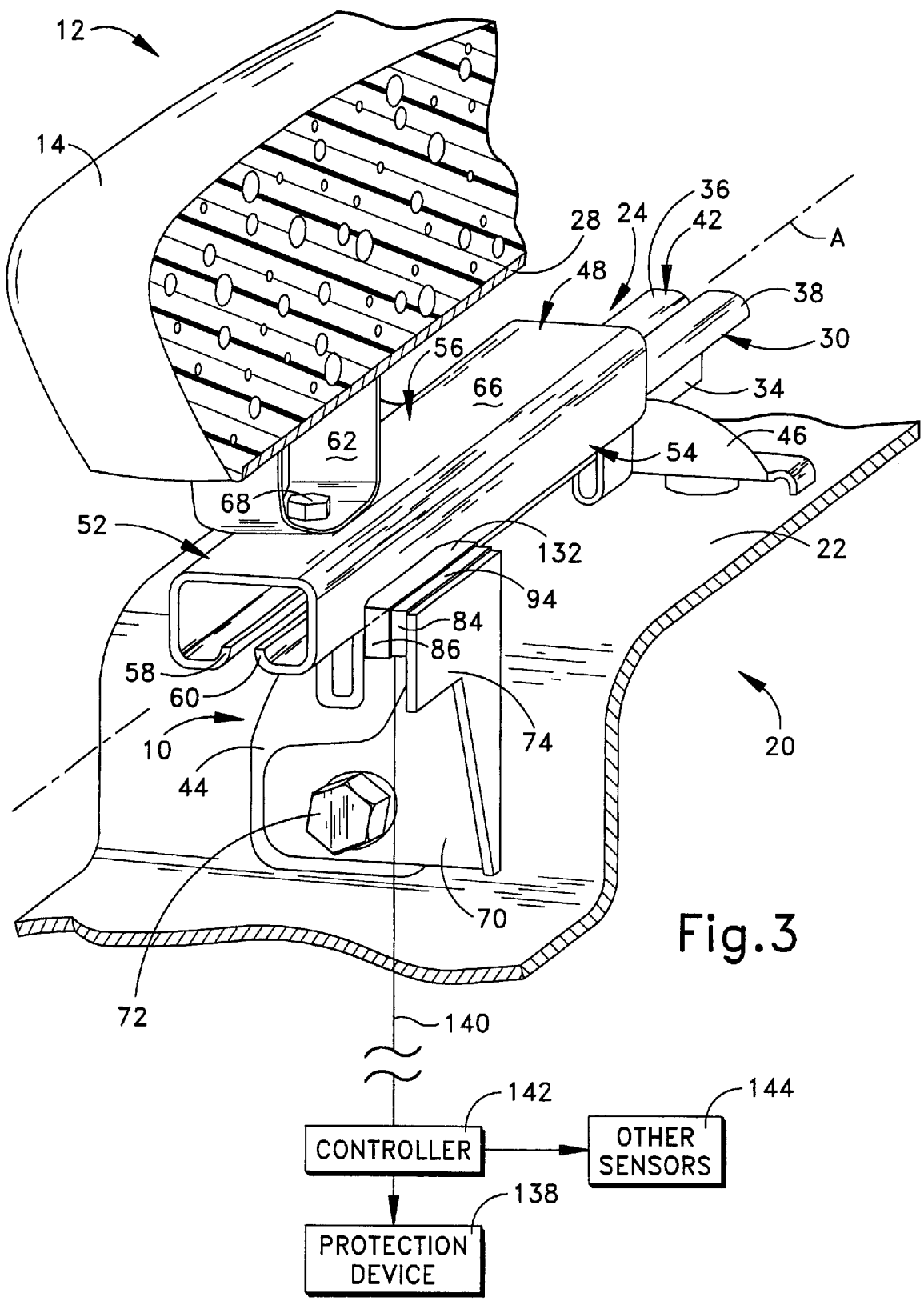
FIG. 3 is an enlarged perspective view of a portion of FIG. 1, illustrating a rail member of the vehicle seat in the reference position.

Each guide track 24 and 26 includes a seat bracket 30 and 32 that is mounted to the lower body portion 22 of the vehicle 20. The seat brackets 30 and 32 are formed of a suitable rigid material such as steel. As illustrated in FIGS. 2 and 3, seat bracket 30 of guide track 24 has a T-shaped cross-section. The seat bracket 30 includes a vertical base portion 34 and opposed flanged portions 36 and 38. The flanged portions 36 and 38 extend perpendicularly outwardly from the vertical base portion 34 a short distance before curving downwardly in a direction parallel to the base portion 34.

The seat bracket 30 extends axially along axis A. The seat bracket 30 includes a forward end portion 40 (FIG. 2) and a rearward end portion 42 (FIG. 3). A pair of bracket members 44 and 46 secures the vertical base portion 34 of the seat bracket 30 to the lower body portion 22 of the vehicle 20. Bracket member 44 connects the forward end portion 40 of the seat bracket 30 to the lower body portion 22 of the vehicle 20 and bracket member 46 connects the rearward end portion 42 of the seat bracket 30 to the lower body portion 22 of the vehicle 20. The flanged portions 36 and 38 of the seat bracket 30 form a pair of adjacent, axially extending channels.

Seat bracket 32 (FIG. 1) is substantially identical to seat bracket 30 described above. Alternatively, a single elongated seat bracket (not shown) could be used instead of the pair of the coaxial seat brackets shown in FIG. 1.

Referring to FIG. 1, the guide tracks 24 and 26 also include rail members 48 and 50. The rail members 48 and 50 are mounted to the lower surface 28 of the seat cushion portion 14 of the seat 12. Preferably, each rail member 48 and 50 is constructed of a ferromagnetic material, such as steel.

As shown in FIGS. 2 and 3, seat bracket 30 supports rail member 48. Rail member 48 is movable relative to seat bracket 30 in a direction parallel to axis A. Bearings (not shown) may be used between rail member 48 and seat bracket 30 to facilitate relative movement of rail member 48.

Rail member 48 has a forward and a rearward end portion 52 and 54, respectively, with an elongated body portion 56 extending between the respective end portions 52 and 54. Rail member 48 has a generally rectangular cross-section. As shown in FIG. 3, a pair of opposed upturned flange portions 58 and 60 collectively form a lower sidewall of rail member 48. The flange portions 58 and 60 of rail member 48 define axially elongated channel portions that extend through the rectangular cross-section of rail member 48. The channel portions of rail member 48 receive the flanged portions 36 and 38 of the seat bracket 30.

Rail member 50 (FIG. 1) is substantially identical to rail member 48 described above. Alternatively, a single elongated rail member (not shown) could be used instead of the two spaced apart rail members shown in FIG. 1.

Frame members 62 and 64 are used to mount the seat cushion portion 14 of the seat 12 to the rail members 48 and 50. As shown in FIGS. 2 and 3, frame member 62 extends downwardly from the lower surface 28 of the seat cushion portion 14 of the seat 12 and engages an upper side wall 66 of rail member 48. A fastener 68 is used to secure frame member 62 to the upper sidewall 66 of rail member 48. Frame member 64 (FIG. 1) is attached to rail member 50 in a similar manner.

While a preferred embodiment of the guide tracks 24 and 26 has been described, it will be understood and appreciated by those skilled in the art that the apparatus 10 of the present invention may be used with any known type of guide track.

Referring to FIGS. 2 and 3, the forward bracket member 44 includes a support structure 70. A fastener 72 attaches the support structure 70 to the forward bracket member 44. The support structure 70 includes an L-shaped support member 74 that extends from the forward bracket member 44 in a direction generally parallel to axis A. Alternatively, the support structure 70 may be attached to the lower body portion 22 of the vehicle 20 or the rearward bracket member 46.

The support structure 70 illustrated in FIGS. 2 and 3 is positioned adjacent the forward end portion 40 of seat bracket 30. The position of the support structure 70 defines a reference position. As illustrated in FIG. 3, when the forward end portion 52 of rail member 48 is adjacent the support structure 70, rail member 48 is said to be in the reference position relative to seat bracket 30. When rail member 48 is in the reference position relative to seat bracket 30, the position of the seat 12 is known. Those skilled in the art will recognize that the support structure 70, and thus the reference position, may be placed at any location along the axial path of rail member 48.

Figure 4:
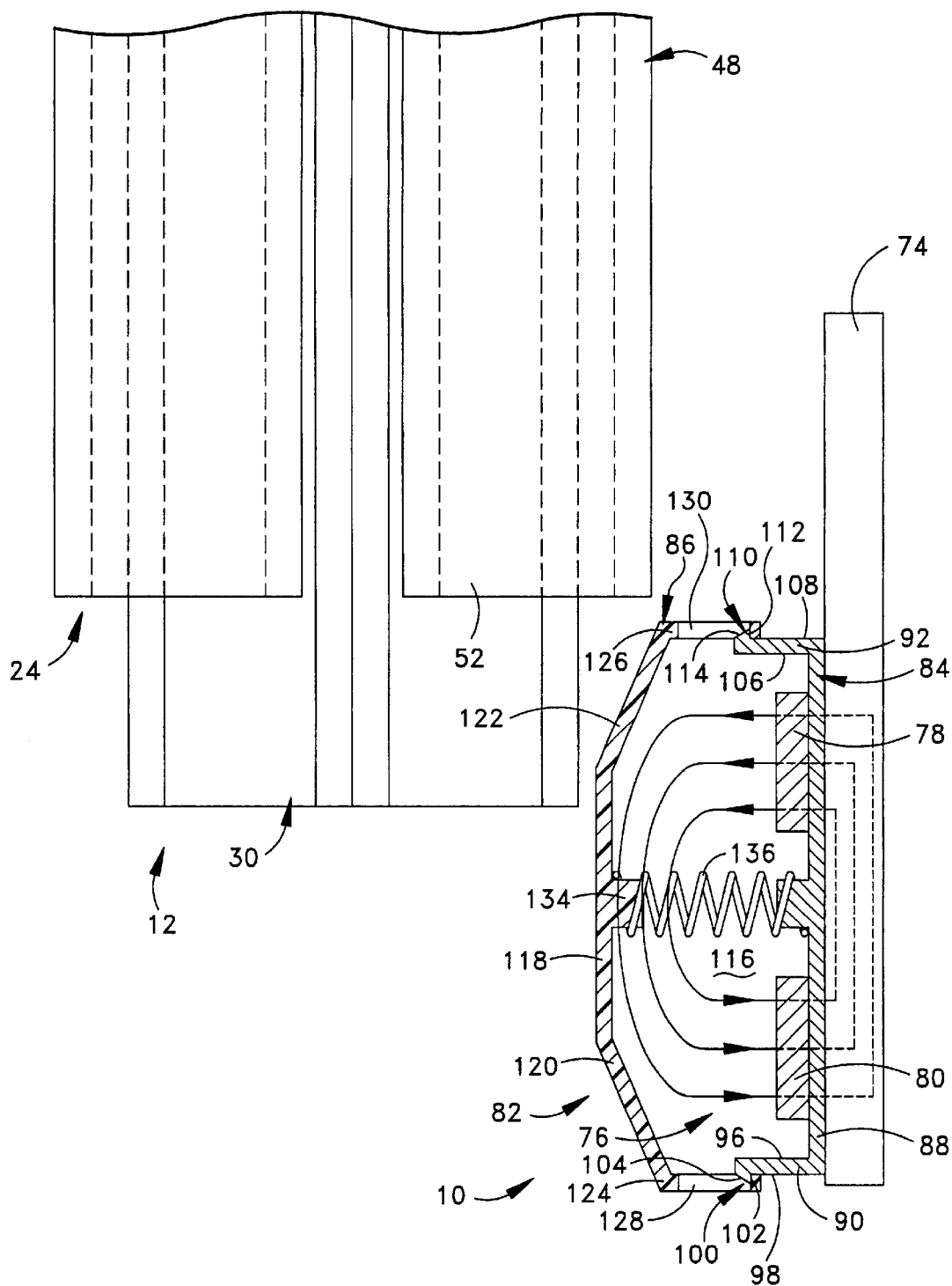
FIG. 4 is an enlarged sectional view of a portion of the apparatus, illustrating a rail member of the vehicle seat rearward of a reference position, with certain parts shown schematically.
Figure 5:
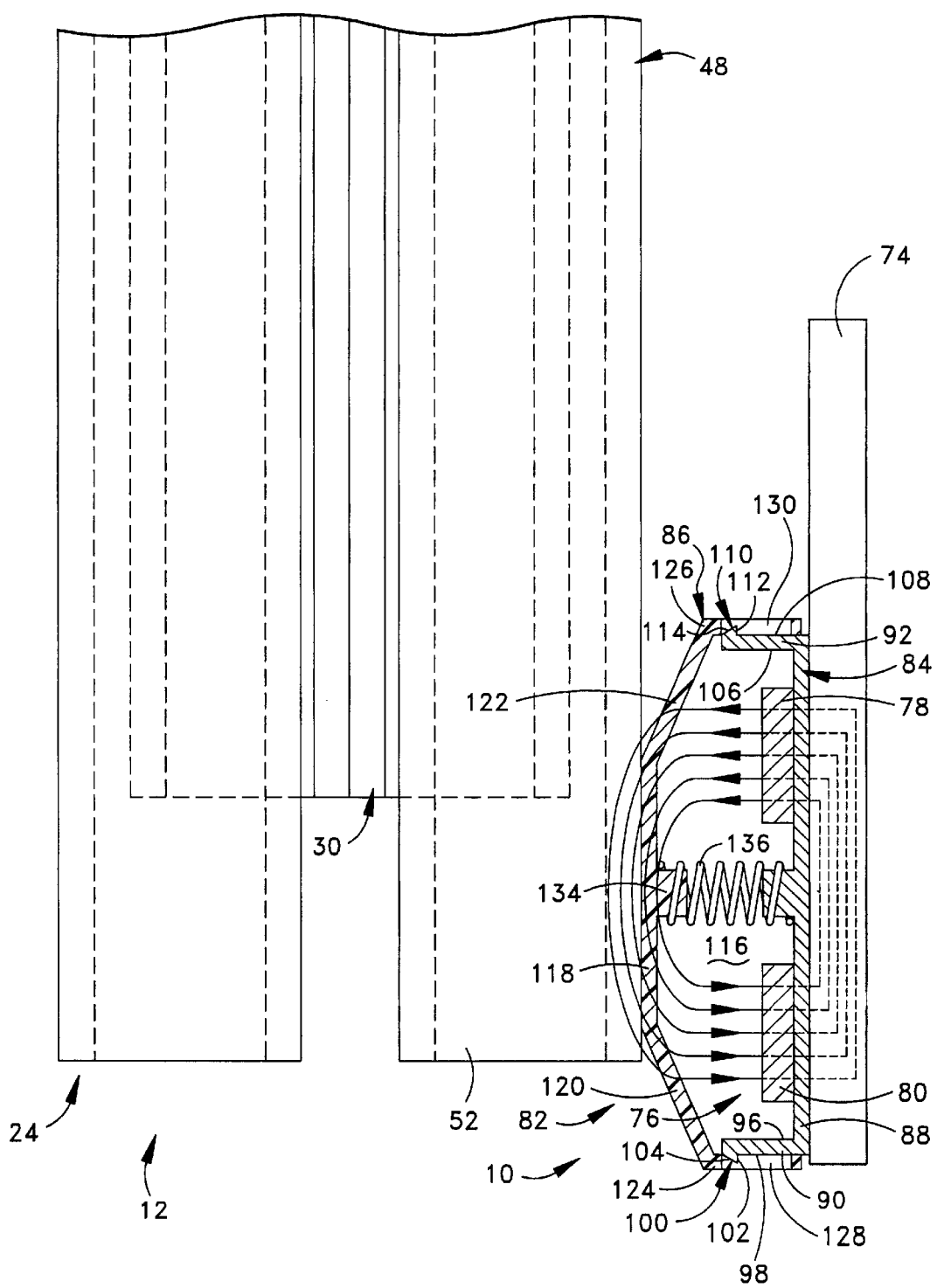
FIG. 5 is an enlarged sectional view of a portion of the apparatus, illustrating a rail member of the vehicle seat in the reference position, with certain parts shown schematically.

The apparatus 10 of the present invention includes a magnetic sensor 76 (FIGS. 4 and 5). The magnetic sensor 76 produces a magnetic field and senses the flux density of the magnetic field. When the flux density of the magnetic field increases above a threshold level, the magnetic sensor 76 produces an output signal indicating that rail member 48 is in the reference position relative to seat bracket 30.

As shown in FIGS. 4 and 5, the magnetic sensor 76 preferably includes a permanent magnet 78 and a Hall effect device 80. The magnet 78 produces the magnetic field and the Hall effect device 80 senses the flux density of the magnetic field.

The apparatus 10 further includes a housing 82 for enclosing the magnetic sensor 76. The housing 82 includes a frame 84 and a cover 86. The frame 84 includes a rectangular back wall 88 and four side walls (two of which are shown in FIGS. 4 and 5) that extend perpendicularly outwardly from the edges of the back wall 88. Left and right side walls 90 and 92, respectively, extend across widthwise edges of the back wall 88 and interconnect an upper side wall 94 (FIGS. 2 and 3) and lower side wall (not shown) that extend across lengthwise edges of the back wall 88.

The left side wall 90 includes an inner surface 96 and an outer surface 98. A lip 100 extends outwardly of the outer surface 98 of the left side wall 90 for engaging a portion of the cover 86. The lip 100 is centrally located along the width of the left side wall 90 and includes a flat lower surface 102 that extends perpendicular to the outer surface 98 of the left side wall 90. A ramped upper surface 104 of the lip 100 extends from the flat lower surface 102 away from the back wall 88 of the frame 84 and inwardly until meeting the outer surface 98 of the left side wall 90.

The right side wall 92 also includes an inner surface 106 and an outer surface 108. A lip 110 extends outwardly of the outer surface 108 of the right side wall 92 for engaging a portion of the cover 86. The lip 110 is centrally located along the width of the right side wall 92 and includes a flat lower surface 112 that extends perpendicular to the outer surface 108 of the right side wall 92. A ramped upper surface 114 of the lip 110 extends from the flat lower surface 112 away from the back wall 88 of the frame 84 and inwardly until meeting the outer surface 108 of the right side wall 92.

The upper wall 94 (FIGS. 2 and 3) of the frame 84 extends outwardly from the back wall 88 of the frame 84 a distance approximately fifteen percent farther than the left and right end walls 90 and 92. Left and right ends (not shown) of the upper wall 94 are beveled to mate with the left side wall 90 and the right side wall 92, respectively. The lower side wall (not shown) of the frame 84 is identical to the upper side wall 94.

The cover 86 is designed to fit over the frame 84 to form a cavity 116 within the housing 82. The cover 86 includes a base wall 118 and four side walls (two of which are shown in FIGS. 4 and 5) that extend perpendicularly outwardly from edges of the base wall 118. The base wall 118 is generally rectangular and has a length and width slightly larger than a length and width of the back wall 88 of the frame 84. A first beveled end 120 and a second beveled end 122 of the base wall 118 of the cover 86 extend outwardly of a plane of the base wall 118 at an angle equal to the bevels on the left and right ends (not shown) of the upper and lower side walls of the frame 84.

Left and right side walls 124 and 126 of the cover 86 include slots 128 and 130, respectively, that extend, in a central location along the width of the respective side wall 124 and 126, away from the base wall 118 of the cover 86 and terminate near an end of the respective side wall 124 and 126. Each slot 128 or 130 is designed to receive a lip 100 or 110 of the corresponding side wall 90 or 92 of the frame 84. The slots 128 and 130 on the left and right side walls 124 and 126 are also designed to allow the base wall 118 of the cover 86 to move toward or away from the back wall 88 of the frame 84 by allowing the respective lips 100 and 110 to slide within the slots 128 and 130. The upper side wall 132 (FIGS. 2 and 3) and lower side wall (not shown) of the cover 86 are shaped and sized to fit over the upper and lower side walls of the frame 84. Thus, a side wall of the cover 86 overlies each side wall of the frame 84.

The cover 86 further includes a spring guide 134 (FIGS. 4 and 5) that extends outwardly from the base wall 118 in the direction of the side walls of the cover 86. The spring guide 134 is sized to be received in a center of a helical spring 136.

To assembly the housing 82 a helical spring 136 is placed over the spring guide 134 and interposed between the base wall 118 of the cover 86 and the back wall 88 of the frame 84. The cover 86 is attached to the frame 84 such that the lip 100 of the left side wall 90 of the frame 84 is inserted into the slot 128 on the left side wall 124 of the cover 86 and the lip 110 of the right side wall 92 of the frame 84 is inserted into the slot 130 on the right side wall 126 of the cover 86.

The cover 86 has a first position and a second position. In the first position, the helical spring 136 is expanded and the base wall 118 of the cover 86 is located at its farthest position away from the back wall 88 of the frame 84. The cavity 116 within the housing 82 has its greatest volume when the cover 86 is in the first position. The helical spring 136 biases the cover 86 into the first position and the cover 86 remains in the first position until a force sufficient to compress the helical spring 136 forces the cover 86 into the second position. The first position of the cover 86 is illustrated in FIG. 4. In the second position, the helical spring 136 is compressed and the base wall 118 of the cover 86 is at its nearest position to the back wall 88 of the frame 84. The second position of the cover 86 is illustrated in FIG. 5.

In an assembled apparatus 10, the magnetic sensor 76 is affixed to the back wall 88 of the frame 84. The Hall effect device 80 of the magnetic sensor 76 is positioned relative to the magnet 78 of the magnetic sensor 76 such that the Hall effect device 80 is within the magnetic field produced by the magnet 78. A signal wire, shown schematically as 140 in FIGS. 1–3, extends through a hole (not shown) in the back wall 88 of the frame 84 and connects to the Hall effect device 80 of the magnetic sensor 76.

To mount the apparatus 10 to the vehicle seat 12, the back wall 88 of the frame 84 of the housing 82 is affixed to the support member 74. The frame 84 may be affixed to the support member 74 in any suitable manner, such as by a suitable adhesive. When affixed to the support member 74 the left side wall 90 and right side wall 92 of the frame 84 are located axially opposite one another, relative to axis A. Thus, the first beveled end 120 of the cover 86 is on an end of the housing 82 facing forward and a second beveled end 122 of the cover 86 is on an end of the housing 82 facing rearward.

When the vehicle seat 12 is in a rearward position, illustrated in FIG. 2, the forward end portion 52 of rail member 48 is axially spaced from a rearward facing end, shown as second beveled end 122, of the cover 86. When rail member 48 is axially spaced from the cover 86, the cover 86 is biased to the first position. When the vehicle seat 12 is in a forward position, illustrated in FIG. 3, the forward end portion 52 of rail member 48 is adjacent the cover 86 of the housing 82. When rail member 48 is moved to a position adjacent the cover 86, the forward end portion 52 of rail member 48 engages the second beveled end 122 of the cover 86 and moves the cover 86 from the first position to the second position. In the second position, a portion of the base wall 118 of the cover 86 contacts rail member 48.

As shown in FIG. 4, the magnetic field produced by the magnetic sensor 76 is conducted in a path between north and south poles of the magnet 78. When rail member 48 is in the rearward position and the cover 86 is in the first position, much of the magnetic field produced by the magnetic sensor 76 is contained within the cavity 116 of the housing 82. As a result, the cover 86 prevents foreign ferrous materials from increasing the flux density of the magnetic field above a threshold level. The arrows in FIG. 4 indicate the magnetic field of a flux density below the threshold level.

As the vehicle seat 12 is adjusted to the forward position of FIG. 3, the forward end portion 52 of rail member 48 contacts the second beveled end 122 of the cover 86 and moves the cover 86 from the first position into the second position so that the forward end portion 52 of rail member 48 is positioned adjacent the cover 86, as illustrated in FIG. 5. When the rail member 48 is adjacent the cover 86, rail member 48 is said to be in the reference position relative to seat bracket 30. As shown in the enlarged view of FIG. 5, when the cover 86 is in the second position, a greater amount of the magnetic field extends outside the cavity 116 of the housing 82. The magnetic field extending outward of the cover 86 extends through the ferrous material of rail member 48. As a result, the magnetic flux of the magnetic field is increased above the threshold level. The arrows in FIG. 5 indicate the magnetic field of a flux density above the threshold level.

The reference position is determined by the position of the apparatus 10 relative to the seat rail 48. As stated above, the reference position may be adjusted by adjusting the position of the apparatus 10.

Preferably, the rail member 48 is constructed of a ferromagnetic material. However, it may be desirable to incorporate a rail member 48 that is constructed of a non-ferromagnetic material. In such an instance, a ferrous member (not shown) could be affixed to the rail member 48, such that the ferrous member would move with the rail member 48. The ferrous member would conduct the magnetic field of the magnet, causing the flux density of the magnetic field to increase above the threshold level.

The information provided by the apparatus 10 of the present invention can be used to control the operation of a vehicle occupant protection device 138. Depicted schematically in FIGS. 1–3, an output signal from magnetic sensor 76 may be transferred through the signal wire 140 to a controller 142. The controller 142 may comprise a microcomputer, an integrated circuit, a plurality of discrete components, or a combination of integrated circuits and discrete components configured to provide desired functions.

As illustrated, the controller 142 may be electrically coupled to an actuatable vehicle occupant protection device 138 for, when actuated, helping to protect a vehicle occupant in a crash event. The protection device 138 suitably is an air bag. Other actuatable vehicle occupant protection devices that can be used in accordance with the present invention include, for example, inflatable knee bolsters, and knee bolsters operated by inflatable air bags.

The controller 142 also may be coupled to other sensors 144. The other sensors 144 may include, for example, a crash sensor, a seat belt buckle switch sensor, a vehicle speed sensor, an occupant weight sensor or any other sensing device or combination of devices which provide useful information concerning actuation of the protection device 138. The other sensors 144 provide signals to the controller 142 indicative of one or more vehicle and/or occupant conditions.

The controller 142 utilizes the output signal from the magnetic sensor 76 to control the actuation of the protection device 138. For example, where the reference position is a forwardmost position of the seat 12 and output signal of the magnetic sensor 76 indicates that the rail member 48 of the seat 12 is at the reference position relative to the seat bracket 30, the controller 142 may control actuation of the occupant protection device 138 so that the protection device 138 inflates to only a first level. Under appropriate circumstances, the output signal of the magnetic sensor 76 also might be used by the controller 142, in combination with the signals from the other sensors 144, to delay or even prevent actuation of the protection device 138.

Figure 6:
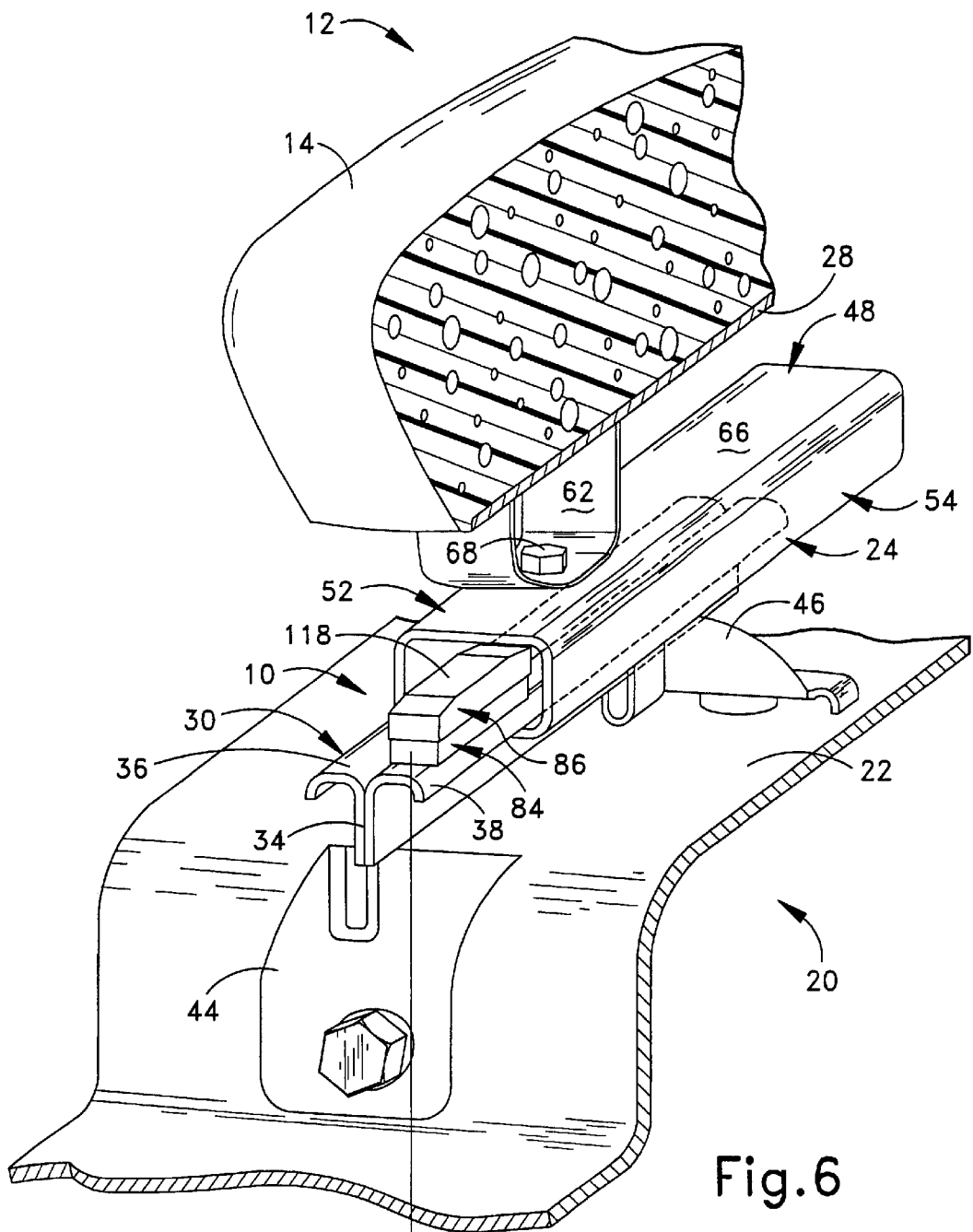
FIG. 6 is an enlarged perspective view of a portion of a vehicle seat including an apparatus of the present invention mounted in an alternate location on the vehicle seat.

FIG. 6 illustrates an apparatus 10 constructed in accordance with the present invention mounted in an alternate location on the vehicle seat 12. In FIG. 6, the support structure 70 and the support member 74 are eliminated and the apparatus 10 is mounted directly to the seat bracket 30. The back wall 88 of the frame 84 of the housing 82 is affixed to the flanged portions 36 and 38 of the seat bracket 30 on a side opposite the vertical base portion 34. A bearing (not shown) that separates rail member 48 from the flanged portions 36 and 38 of the seat bracket 30 must be axially spaced from the apparatus 10.

The frame 84 is affixed to the flanged portions 36 and 38 such that a beveled end 120 or 122 of the cover 86 faces rearward. When rail member 48 is moved forward, the upper side wall 66 of the forward end portion 52 of rail member 48 will contact the rearward facing beveled end 120 or 122 of the cover 86. As the forward end portion 52 of rail member 48 moves into the reference position, rail member 48 will force the cover 86 to move from the first position to the second position. In the second position, ferrous material of rail member 48 or a ferrous member attached to rail member 48 will cause the flux density of the magnetic field to increase above the threshold level.

Figure 7:
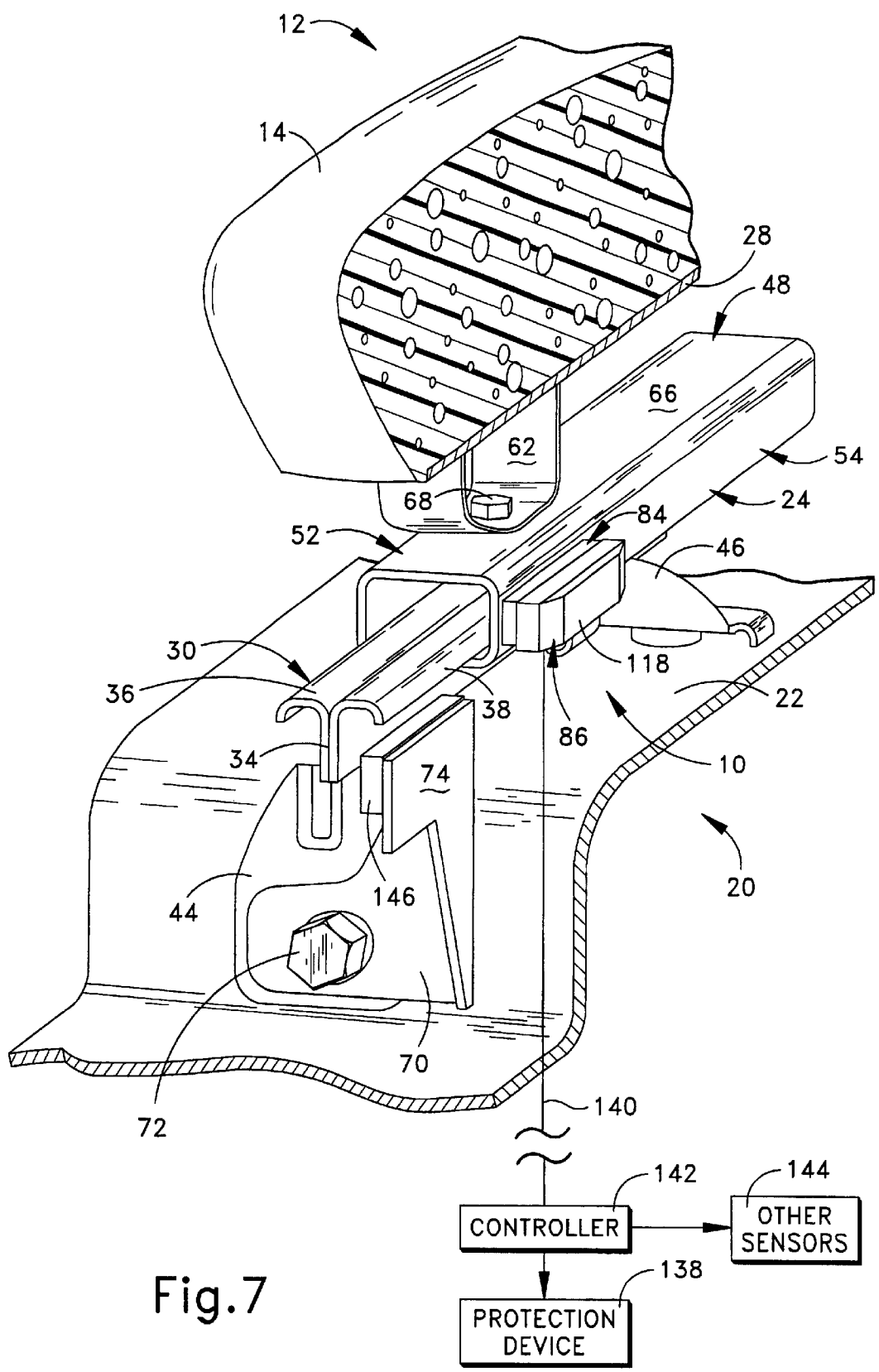
FIG. 7 is an enlarged perspective view of a portion of a vehicle seat including an apparatus of the present invention mounted in a second alternate location on the vehicle seat.

FIG. 7 is an enlarged perspective view of a portion of a vehicle seat 12 including an apparatus 10 of the present invention mounted in a second alternate location on the vehicle seat 12. As illustrated, the back wall 88 of the frame 84 of the apparatus 10 is affixed to the side wall of rail member 48 that passes adjacent to support member 74 of support structure 70. The frame 84 is mounted to the side wall of rail member 48 such that a beveled end 120 or 122 of the cover 86 faces forward.

A bumper 146 is attached to the support member 74 of the support structure 70. Preferably, the bumper 146 is made of a ferrous material. Alternately, a ferrous member may be attached to the bumper 146. The bumper 146 contacts the forward facing beveled end 120 or 122 of the cover 86 during movement of the rail member 48 into the reference position and moves the cover 86 from the first position to the second position. When in the second position, the ferrous bumper 146, or alternatively the ferrous member attached to the bumper 146, increases the flux density of the magnetic field above the threshold value.

Figure 8:
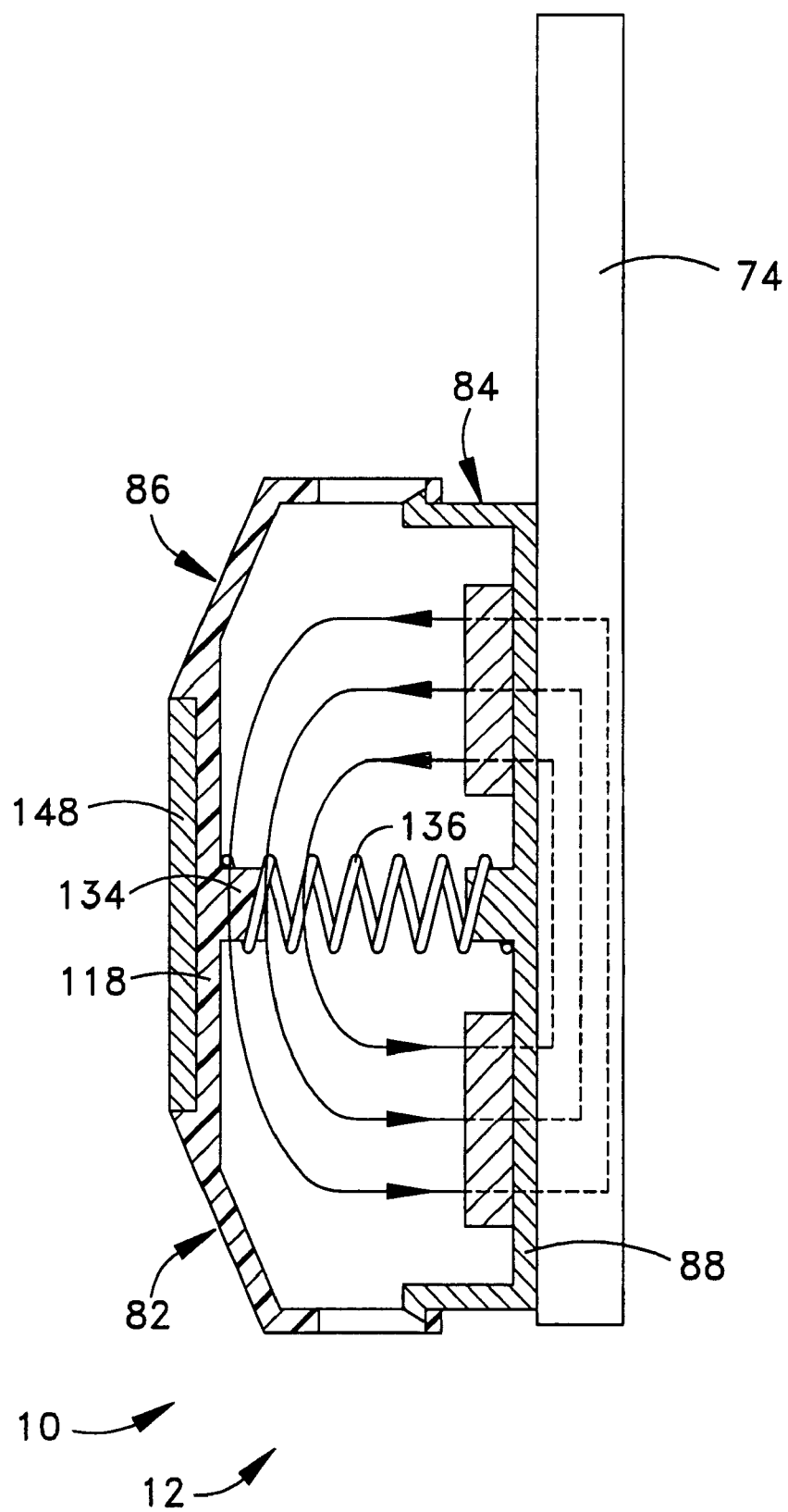
FIG. 8 is an enlarged perspective view of a portion of a vehicle seat including a second embodiment of the apparatus of the present invention.

FIG. 8 is an enlarged perspective view of a portion of a vehicle seat 12 including a second embodiment of the apparatus 10 of the present invention. In the second embodiment of the apparatus 10, a ferrous member 148 is molded into the base wall 118 of the cover 86. When the cover 86 is in the first position, the ferrous member 148 will not increase the flux density of the magnetic field above the threshold level. When in the second position, the ferrous member 148 will increase the flux density of the magnetic field above the threshold level.

The apparatus 10 of FIG. 8 may be mounted in any of the positions previously illustrated as well as any other positions apparent to one of ordinary skill in the art. The second embodiment of the apparatus 10 eliminates the need to place a ferrous member adjacent the cover 86 when the cover 86 is in the second position. As a result, when mounting the apparatus 10 as illustrated in any of FIGS. 1–6, rail member 48 may be made of nonferrous material and no ferrous member need be attached to rail member 48. Also, when mounting the apparatus 10 as illustrated in FIG. 7, the bumper 146 may be made of non-ferrous material and no ferrous member need be attached to the bumper 146.

From the above description of the invention, those skilled in the art will perceive improvements, changes and modifications. Such improvements, changes and modifications within the skill of the art are intended to be covered by the appended claims.

Having described the invention, we claim the following:

1. An apparatus for sensing whether a rail member of a vehicle seat is located in a reference position relative to a seat bracket of the vehicle seat, the apparatus comprising:

a magnetic sensor for generating a magnetic field and for sensing a flux density of the magnetic field; and a cover for enclosing the magnetic sensor, the cover, when in a first position, forming a zone for preventing the flux density from increasing above a threshold level, the cover being moved into a second position when the rail member is located in the reference position relative to the seat bracket, in the second position the flux density increasing above the threshold level.

2. The apparatus as defined in claim 1, wherein the magnetic sensor is fixed relative to the seat bracket of the vehicle seat, and the rail member of the vehicle seat moves the cover into the second position.

3. The apparatus as defined in claim 1, wherein the magnetic sensor is fixed relative to the rail member of the vehicle seat, and the cover is moved into the second position by a bumper that is fixed relative to the seat bracket of the vehicle seat.

4. The apparatus as defined in claim 2, wherein the rail member is ferrous.

5. The apparatus as defined in claim 3, wherein the bumper is ferrous.

6. The apparatus as defined in claim 3 further comprising a ferrous member molded to a portion of the cover.

7. The apparatus as defined in claim 1 further comprising a biasing element for biasing the cover into the first position.

8. The apparatus as defined in claim 2, wherein the cover has beveled ends for contacting the rail member and moving the cover from the first position to the second position.

9. The apparatus as defined in claim 3, wherein the cover has beveled ends for contacting the bumper and moving the cover from the first position to the second position.

10. The apparatus as defined in claim 1 further comprising a frame for supporting the magnetic sensor and the cover, the frame has outwardly extending lips, and the cover has slots that are engaged by the outwardly extending lips of the frame for allowing the cover to move relative to the frame.

* * * * *